United States Patent [19]
Wiggs

[11] Patent Number: 4,725,195
[45] Date of Patent: Feb. 16, 1988

[54] ADVANCED PIGGYBACK WATER POWER GENERATOR

[76] Inventor: B. Ryland Wiggs, 3630 Villanova Ct., Bethlehem, Pa. 18017

[21] Appl. No.: 29,994

[22] Filed: Mar. 25, 1987

[51] Int. Cl.⁴ .............................................. F03B 7/00
[52] U.S. Cl. .................................... 415/7; 415/121 G; 416/85
[58] Field of Search ................. 415/7, 121 G; 416/85, 416/DIG. 6, 247 A

[56] References Cited

U.S. PATENT DOCUMENTS

| | | | |
|---|---|---|---|
| 78,488 | 6/1868 | Shepard | 416/85 X |
| 100,761 | 3/1870 | Heitmann | 415/7 |
| 408,075 | 7/1889 | Brown | 415/7 |
| 938,989 | 11/1909 | Duncan | 415/7 |
| 950,676 | 3/1910 | Price | 415/7 |
| 984,025 | 2/1911 | Rhodes | 415/7 X |
| 1,292,454 | 1/1919 | Gillinger | 415/7 |
| 1,308,649 | 7/1919 | Watkins | 415/7 X |
| 1,368,454 | 2/1921 | Rebman | 416/85 |
| 1,396,994 | 11/1921 | Cate | 415/7 |
| 1,500,051 | 7/1924 | Caldwell | 415/7 |
| 1,797,089 | 3/1931 | Huffstutter | 415/7 |
| 4,270,056 | 5/1981 | Wright | 416/85 X |
| 4,352,990 | 10/1982 | Aucoin | 290/54 |
| 4,590,386 | 5/1986 | Wiggs | 416/247 A |
| 4,598,210 | 7/1986 | Biscomb | 415/7 X |

FOREIGN PATENT DOCUMENTS

| | | | |
|---|---|---|---|
| 2730735 | 1/1979 | Fed. Rep. of Germany | 416/85 |
| 1005948 | 4/1952 | France | 416/85 |
| 126574 | 8/1982 | Japan | 416/85 |
| 575 | 1/1984 | Japan | 415/7 |

Primary Examiner—Everette A. Powell, Jr.

[57] ABSTRACT

A water power apparatus, composed of independent, uniquely combined, and improved design features, which provides for: (1) side pontoons, the respective bows of which angle water away from the water flowing directly into the paddle wheels; (2) the addition of wheels to the cone shaped legs so as to enable vessel positioning in shallow water areas; (3) vertically dividing each respective side paddle wheel set in half, via a solid disk division extending vertically, at a right angle to, and from, the central axle to the outside extreme end of the paddle blades, off-setting the 90 degree spaced paddle blades in each such divided set by 45 degrees, and enclosing the extreme ends of each such set of divided paddle wheels via a similar solid, vertical disk enclosure extending vertically, at a right angle to, and from, the central axle to the outside extreme end of the paddle blades; (4) a gearing system utilizing the outside edge perimeter of a side paddle wheel disk enclosure, adjacent to the center boat, via vertically extended bars and/or pegs engaging roller bearings or sprockets attached to a common axle, with a sprocket or pulley in the center, extending across the forward section of the central boat from one paddle wheel to the other; (5) an angled, retractable, solid forward water deflection screen to slow and/or stop the paddle wheels via slowing and/or stopping the water striking the paddle wheels; (6) cupped flanges around the paddle wheel axle and gearing axle to prevent water from draining into shaft roller bearings; and (7) a cover for the paddle wheels to inhibit adverse effects from wind and/or water spray.

2 Claims, 8 Drawing Figures

1

ADVANCED PIGGYBACK WATER POWER GENERATOR

SUMMARY OF THE INVENTION

This invention relates to an actual, working, hydraulic generating machine which may be used to generate mechanical power and/or electricity from a boat or vessel moored or anchored in a stream or current of water.

Additionally, independent objects of this advanced power generating system are to significantly improve the operation and efficiency of my former Piggy Back Water Power Generator. See U.S. Pat. No. 4,590,386. The significant improvements consist of unique combinations and methods: to maximize the efficiency of water power striking the paddle wheels; to enable vessel positioning in shallow water; to significantly reduce stress on the central paddle wheel axle, while eliminating vessel shifting from side to side, and while providing a constant and steady power take-off source; to provide an efficient and lightweight gearing system; to slow and/or stop the revolving paddle wheels absent bulky and/or expensive breaking systems; to prevent water from draining into, and damaging, shaft roller bearings; to protect the paddle wheels from adverse wind effects and resulting power loss, as well as to protect the vessel from excessive ice build up in winter; to eliminate the possibility of the vessel sinking; and to provide an emergency paddle wheel stopping device.

The present invention improvements differ from other related inventions in a number of substantial and basic respects, which are discussed categorically as follows:

(1) No U.S. Patents of record show utilization of side pontoons with bows angling water away from the water flowing directly into the paddle wheels. To the contrary, prior patents show side deflectors angling water into the water flowing into the paddle wheels. See, Inter alia, U.S. Pat. No. 4,352,990. Testing has shown that, while in a totally restricted flow, angling the water into the paddle wheels will increase water speed, the opposite result occurs when water is angled into the paddle wheels of a vessel in the center of an unrestricted stream, with water flowing by on each side of the vessel.

In fact, in an unrestricted stream, angling the water into the paddle wheels increases the water elevation between the side pontoons, but slows down the speed of the water entering the paddle wheels. Thus, for optimum efficiency in a power generating vessel design, which vessel does not entirely traverse the entire width of the stream, the forward bow section of the side pontoons should be angled away from the center so as not to slow the speed, and/or so as not to reduce the kinetic energy, of the water entering the paddle wheels.

(2) While no U.S. Patents of record claimed legs for generating vessels, prior to my former claim in U.S. Pat. No. 4,590,386, neither have any U.S. Patents of record shown wheels attached to such legs for assistance in positioning such vessels in shallow water areas. In fact, in order to position a generating vessel in a fast flow river area, one must usually either wait for high water and/or one must be able to move the vessel over shallow areas when moving the vessel into its final intended position. Working in high water is difficult and dangerous. Working in low water is virtually impossible unless one is able to move the vessel. Consequently, the attachment of wheels to the bottom portion of the legs will enable such vessels to be moved and properly situated in low water periods, when the installation work is not hampered by strong and deep currents.

(3) No. U.S. Patents of record, other than my U.S. Pat. No. 4,590,386, show a central boat with a set of four, flat, 90 degree spaced, paddle wheels on each side, connected by a central shaft, with each set of such paddle wheels being offset 45 degrees from the other. This particular design, in conjunction with the other design features, as stated in my U.S. Pat. No. 4,590,386, far surpasses the efficiency of other prior designs contemplated.

However, extensive testing has shown that the paddle wheel design, as indicated in my U.S. Pat. No. 4,590,386, can be substantially improved by modifying each respective paddle wheel set on each side of the central boat. Specifically, the improvement consists of vertically dividing each such respective side paddle wheel set in half, via a solid disk division extending from the central axle to the outside extreme end of the paddle blades, offsetting the 90 degree spaced paddle blades in each such divided set by 45 degrees, and enclosing the extreme ends of each such divided set of paddle wheels via a solid, vertical disk division extending from the central axle to the outside extreme end of the paddle blades.

This improvement has several major advantages. While my former design, via U.S. Pat. No. 4,590,386, resulted in excellent power transfer, testing has shown the generating vessel had a tendency to slightly shift from side to side as each respective paddle wheel blade approached and obtained a maximum surface area right angle exposure to the water current. Further, this continuous shifting of maximum stress, from one side of the central vessel to the other, resulted in continuous and significant stress on the central axle. The above-said paddle wheel design improvement completely eliminates the said tendency to shift from side to side, and completely eliminates the resulting unequal stress on the central shaft by insuring the stress on each respective side of the central boat will always be equal.

Also, the insertion of the solid, vertical disks in the center, as well as on each extreme end, of each such respective improved paddle wheel set results in eliminating cross-flow interference with each immediately adjacent 45 degree off-set paddle blade, as well as eliminating the escape of any water around the sides of any of the paddle blades, thereby substantially increasing efficiency. An additional benefit is that the vertical disks substantially increase the strength of each respective paddle wheel set.

While U.S. Pat. No. 4,270,056 did envision utilizing two sets of three bladed, 120 degree spaced, paddle wheel assemblies, placed side by side, the paddles, with 60 degrees between any two such staggered blades, as aforesaid in my U.S. Pat. No, 4,590,386, are too few and increase the risk of stalling under a heavy power load, as well as destroying efficiency via deflecting water flow into the path of each off-set adjacent paddle blade. Further, by not placing equal sets of such paddle wheel assemblies on opposite sides of a central boat and/or power take off device, the design contemplated by U.S. Pat. No. 4,270,056 will result in swaying from side to side, loss of true right angle striking force from the water current, and significant central axle stress. Further, and even more significantly, by not fully enclosing the center and sides, with a vertical disk-type enclosure, of each respective off-set paddle wheel assembly, a full one-half of the available kinetic energy from the water current is lost via water flowing around the sides of the respective paddles.

Thus, as aforesaid, by utilizing my above-said improved paddle wheel design, on opposite sides of a central boat, the vessel's tendency to shift from side to side is eliminated, the stress on the central shaft is significantly reduced, the paddle wheel unit is significantly strengthened, and the loss of available water power via the escape of water around the sides of paddle blades is eliminated; all resulting in an extremely smooth and continuous rotation for highly efficient power transfer to an electric generator.

(4) No U.S. Patents of record show utilization of a gearing system utilizing the outside edge perimeter of a side paddle wheel disk enclosure, adjacent to the center boat, via bars and/or pegs and sprockets or roller bearings. The sprockets, or roller bearings, are engaged by the bars and/or pegs, which drive the sprockets, which are attached to a common axle, supported by pillow block bearings, with a pulley or sprocket in the center for gearing to the generator or power apparatus. The common gear axle extends across the forward, or rear, portion of the central boat from the outside perimeter of one paddle wheel gearing disk to the other. Actual testing has shown that such a gearing device is virtually indispensable when operating a 30 kW, or larger, electrical generating unit. Conventional gearing, via chain drive and/or gear boxes, is so heavy and so expensive that it is simply not feasible. Belt drive systems cannot handle the torque stress. Wheel disk outside edge perimeter pegs and/or bars, as shown here, will drive a small sprocket and/or roller bar assembly at a relatively high speed with a relatively low torque, thereby eliminating the need for extremely heavy and expensive gear boxes and chain, as well as eliminating the need for excessively large paddle wheel shafts designed to take the tremendous torque stress occasioned by conventional gearing systems.

(5) No U.S. Patent of record shows an angled, retractable, solid, forward water deflection screen to slow and/or stop the paddle wheels via slowing and stopping the flow of water striking into them. Such a device easily enables one to stop very large paddle wheels, operating in high speed currents, for maintenance or repairs, absent an expensive and/or cumbersome and bulky breaking system.

The device would be placed and secured in front of the forward angled-back deflection screen, shown in my aforesaid U.S. Pat. No. 4,590,386, when one wished to slow or stop the water flow striking the paddles. The device would extend horizontally for the entire width of the vessel from the forward bow of the center boat to the extreme forward bow of each respective side pontoon. Also, the device would extend vertically from a point above the water surface level to a point slightly below the lowest point of each paddle blade, when each blade is fully extended vertically at a right angle to the water flow, so as to entirely block the flow of the water which would otherwise flow into the paddle wheels.

(6) No U.S. Patent of record shows cupped flanges around the paddle wheel axle and gearing axle to prevent water from draining into the respective shaft roller bearings. This is extremely important for two reasons. First, water running off the paddle wheels along the shaft and into the roller bearings tends to accelerate rusting. Second, such water freezes and continuously builds up ice in the winter, ultimately resulting in damage and/or jamming and/or completely stopping the roller bearings and the paddle wheel unit itself.

(7) No U.S. Patents of record show covers for the paddle wheels of water power generating units. Covers for the paddle wheels are an asset because they prevent potential energy loss via strong head winds, and because they prevent ice build up on the main vessel in the winter from water spray pushed off exposed paddle surface areas via strong winds from any direction. Covers over each respective side paddle wheel unit can be optionally installed on a Piggyback Water Power Generator by simply bolting down respective covers on each side pontoon and on the respective adjacent side of the central boat.

(8) No U.S. Patents of record claim the use of closed-cell, lightweight, water-proof plastic foam (styrofoam, etc.) filling for the power generating vessel and/or side pontoons. The insertion of such plastic foam creates an unsinkable vessel, thereby substantially enhancing personal safety and investment security.

(9) No U.S. Patents of record show an emergency paddle wheel stopping system. One bar, extended vertically, from the outside edge of the side paddle wheel disk adjacent to a side pontoon will act as a lever, stopping the paddle wheels when a second bar, on a swivel, is extended horizontally, under the path of the first bar, from the forward surface of a side pontoon where the swivel is firmly attached. The emergency brake can be released via knocking, with a sledge hammer, the said horizontal bar, on a swivel, out from under the vertical bar affixed to the paddle wheel side. Also, while one such brake can be effectively utilized, it would be beneficial, when possible, for two persons to simultaneously engage two such identically situated brakes on each respective side pontoon so as to lessen stress on the central axle connecting the two respective side paddle wheels.

DETAILED DESCRIPTION OF THE DRAWINGS

Figure 1:
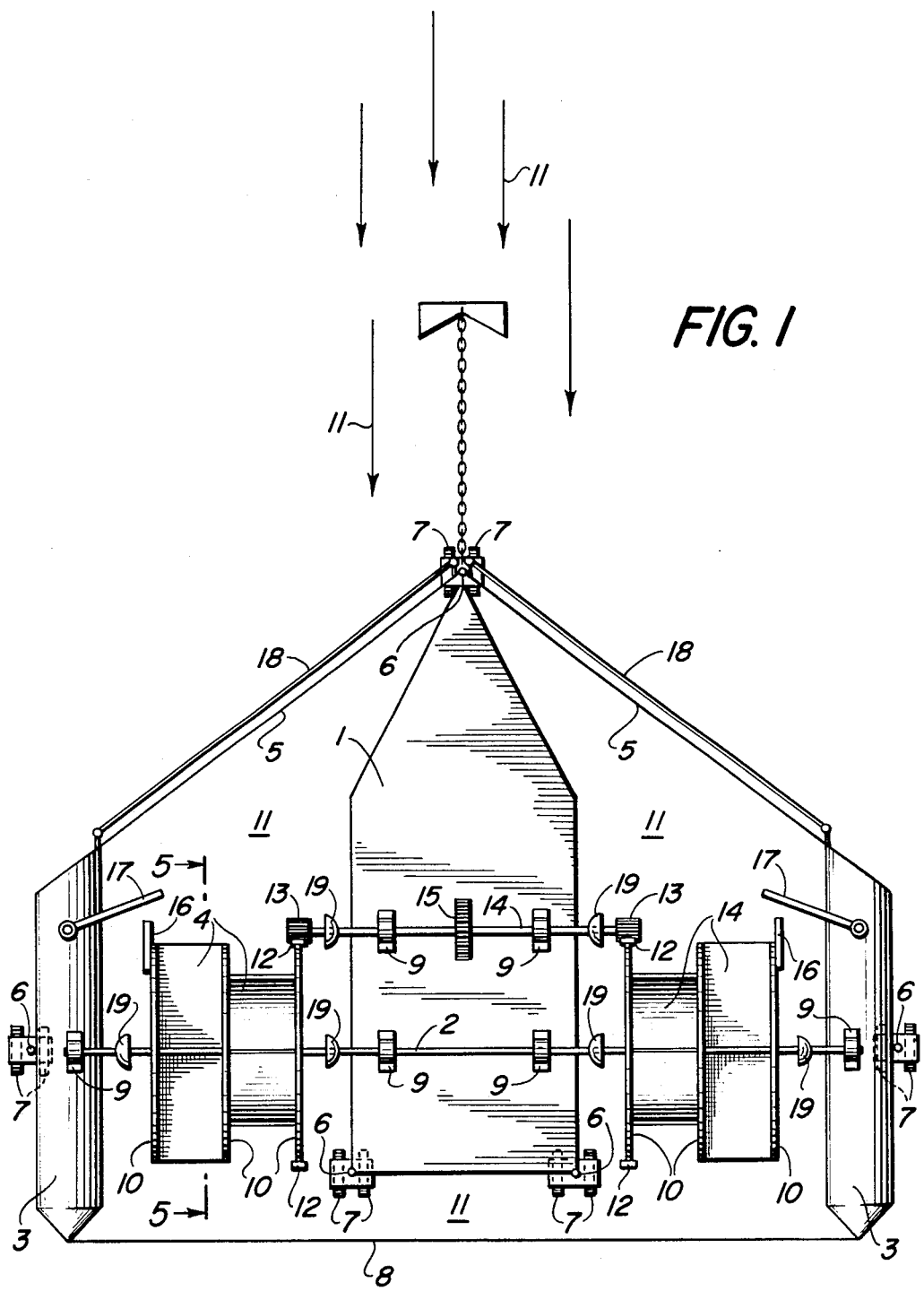
FIG. 1 is a complete top view.

FIG. 1 shows a central boat, or vessel, 1, with side stabilizing pontoons 3, anchored in a current of water (depicted by enlongated arrows). The vessel 1 has been equipped with complete Advanced Piggyback power generating apparatus.

The equipment consists of one central axle 2 straddling the back of a vessel 1, mounted on pillow block bearings 9, with side stabilizing pontoons 3. Both the boat 1 and the respective side stabilizing pontoons 3 are filled with closed cell, lightweight, waterproof, plastic foam (styrofoam, etc.) to prevent sinking.

The axle 2 is turned via water flow pushing against the respective paddle wheels 4, which are each respectively vertically divided in half via a solid disk division 10 extending at a right angle from the central axle 2 to the outside extreme end of the paddle blades 4, offsetting the 90 degree spaced paddle blades 4 in each such divided set by 45 degrees, and enclosing the extreme ends of each such set of divided paddle wheels via a similar, solid, vertical disk 10 extending at a right angle from the central axle to the outside extreme end of the paddle blades 4.

The mechanical energy generated is transferred from the water 11 to electric and/or power generating equipment located on the central boat 1 via a gearing system utilizing the outside edge perimeter of a side paddle wheel disk enclosure 10, adjacent to the center boat 1, via bars and/or pegs 12, which drive small sprockets and/or roller bearings gears 13 attached to another, and smaller, central shaft 1, supported via pillow block bearings 9, extending across the forward section of the central boat 1, with a centrally located sprocket and/or pulley 15 for power transfer to an electric generator, or to other gearing and/or power production equipment.

The unit is equipped with an angled front debris screen 5, as well as with a rear safety screen 8, as described in FIG. 1, via Detailed Description of the Drawings, in my aforesaid prior U.S. Pat. No. 4,590,386. However, this particular unit shows the addition of an angled, retractable, solid water deflection screen 18, which can be lowered into position in front of the angled debris screen 5 so as to slow and/or stop the water 11, thereby slowing and/or stopping the paddle wheels 4.

The unit also shows cupped flanges 19 placed around the paddle wheel axle 2 and the gearing axle 14, so as to prevent water from draining along the respective axles, 2 and 14, into shaft roller bearings 9.

Further, the unit shows an emergency paddle wheel 4 stopping system, consisting of one bar 16, extended vertically, from the outside edge of the side paddle wheel disk 10 adjacent to a side pontoon 3, acting as a lever so as to stop the paddle wheels 4 from turning when a second bar 17, on a swivel, is extended horizontally from the forward surface of a side pontoon, where the swivel is secured, to a position immediately adjacent to the outside rim of the adjacent paddle wheel disk 10 and directly under the rotational path of the first bar 16.

Lastly, the unit shows the addition of wheels 7 to the legs 6, with cone-shaped bottoms. While the legs 6 prevent the paddle wheels 4 from jamming into the bottom during periods of low water, the wheels 7 enable one to easily position and move the subject Advanced Piggyback Water Power Generator during periods of installation and/or repair and/or removal.

Figure 2:
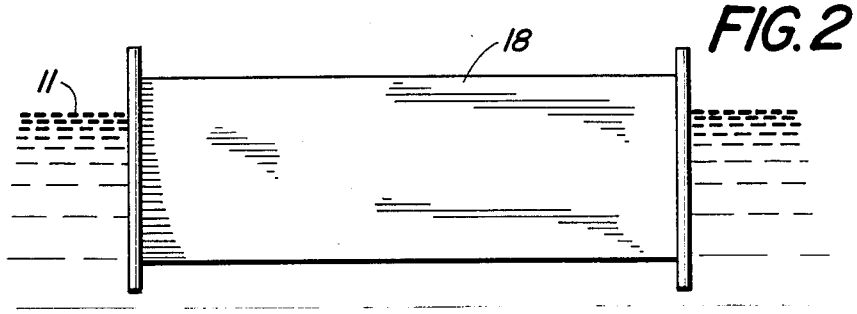
FIG. 2 is a side view of the solid forward water deflection screen.

FIG. 2 depicts a side view of the solid, forward water deflection screen 18, which extends from above the water surface 11 to a depth sufficient to entirely block and deflect the right angle forward flow of the water.

Figure 3:
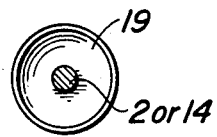
FIG. 3 is a front view of the cupped flange around the axle.

FIG. 3 shows a front view of the cupped flange 19 which is placed around the central paddle wheel axle 2, and around the gearing axle 14, so as to prevent water from draining along the respective shafts and damaging other equipment via rust and/or ice.

Figure 4:
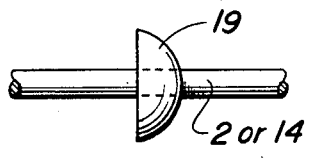
FIG. 4 is a side view of the cupped flange around the axle.

FIG. 4 shows a side view of the cupped flange 19 which is placed around the central paddle wheel axle 2, and around the gearing axle 14, so as to prevent water from draining along the respective shafts and damaging other equipment via rust and/or ice.

Figure 5:
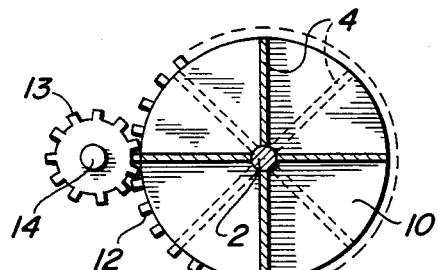
FIG. 5 is a side view of a paddle wheel.

FIG. 5 depicts a side view of a paddle wheel 4, situate around its central axle shaft 2, viewed from the side containing bars and/or pegs 12 extended from the rim of the paddle wheel disk 10 for gearing via engagement with a small sprocket and/or roller bearing gear 13, which is situate around its central axle shaft 14.

Figure 6:
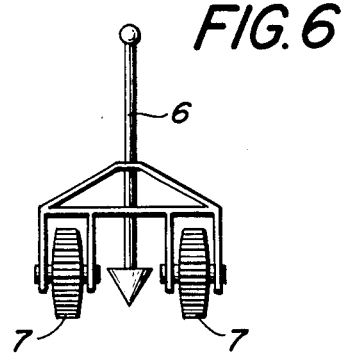
FIG. 6 is a front view of wheels added to the cone shaped legs.

FIG. 6 is a front view of the legs with cone shaped bottoms 6, in conjunction with the addition of wheels 7 for ease in moving and positioning the unit.

Figure 7:
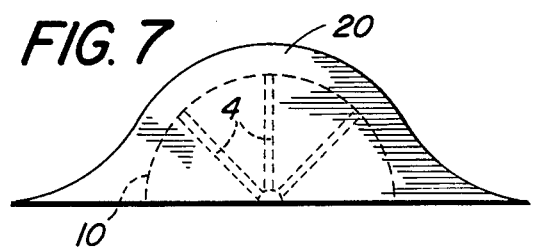
FIG. 7 is a side view of an optional paddle wheel cover.

FIG. 7 is a side view of an optional paddle wheel cover 20 which would completely cover and protect the paddle wheels 4 and their solid disk 10 center and sides.

Figure 8:
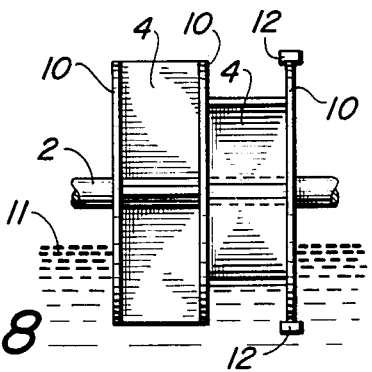
FIG. 8 is a front view of a paddle wheel.

FIG. 8 shows a front view of a side paddle wheel 4, surrounding its central axle shaft 2, with its center and side solid disks 10, with varying water 11 elevations as water builds up head within each of the two paddle wheel 4 segments, as each segment's 90 degree spaced blades approach a right angle to the water flow.

I claim:

1. A power generating system including: a central boat containing gearing and electric and/or power generation equipment, with a forward angled-back deflection screen and a rear non-angled deflection screen, with a smaller outrigger pontoon on each respective side of the central boat, with closed cell, waterproof, plastic foam filling in the central boat and pontoons, and with the bow of the respective outrigger pontoons angled so as to completely turn water away from, and to the outside of, the space and/or incoming water area between each such respective pontoon and the central boat; legs with cone shaped bottoms and with wheels attached, with the wheels extending slightly below the cone shaped bottoms; paddle wheels on each side of the central boat, between the central boat, and respective outrigger pontoons, with 90 degree spaced, flat, paddle blades, and and with a solid, disk division vertically dividing each respective side paddle wheel in half and extending at right angles to, and from, the central axle, to the outside extreme end of the paddle blades, with each such half of the equally divided paddle wheel being constructed so that the 90 degree spaced paddle blades in one half are offset by 45 degrees from the 90 degree spaced paddle blades in the other half, and with the extreme ends of each such set of divided paddle wheels being enclosed via a similar solid, vertical disk division extending in the same manner as the center disk, at right angles to, and from, the central axle, to the outside extreme end of the paddle blades; a gearing system utilizing the outside edge perimeter of a side paddle wheel disk enclosure, which disk is adjacent to the center boat, via vertically extended bars and/or pegs engaging and driving roller bearings or sprockets attached to a common axle, supported by pillow block bearings, extending across the forward, or rear, portion of the central boat from one paddle wheel side gearing disk to the other, with a centrally located sprocket or pulley for power take-off to a generator or other power apparatus; an angled, retractable, solid forward water deflection screen, positioned, when needed, in front of the forward angled debris screen, in a manner so as to slow and/or stop the water flow which would otherwise travel directly into the paddle wheels; cupped flanges around the paddle wheel axle and gearing axle, located on the paddle wheel shaft between the respective paddle wheels and the pillow block bearings, and located on the gearing shaft between the respective paddle wheel gearing sprockets and the pillow block bearings, so as to prevent water from draining along the respective shafts into the pillow block bearings; and an emergency paddle wheel stopping system consisting of one bar, extended vertically, from the outside edge of the side paddle wheel disk adjacent to a side pontoon, acting as a lever so as to stop the paddle wheels from turning when a second bar, on a swivel, is extended horizontally, under the path of the first bar, from the forward surface of a side pontoon, where the swivel is secured, to a position next to the adjacent paddle wheel disk.

2. The power generating system as in claim 1, with an optional cover for the respective paddle wheels, capable of installation and removal via bolts secured to the central boat and respective side pontoons.

* * * * *